(12) United States Patent
Li

(10) Patent No.: US 9,100,985 B2
(45) Date of Patent: Aug. 4, 2015

(54) COORDINATED MULTI-POINT COMMUNICATIONS SYSTEM AND METHODS FOR CONTROLLING COORDINATED MULTI-POINT TRANSMISSION AND RECEPTION

(75) Inventor: Chi-Fang Li, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 365 days.

(21) Appl. No.: 13/396,157

(22) Filed: Feb. 14, 2012

(65) Prior Publication Data
US 2012/0207093 A1    Aug. 16, 2012

Related U.S. Application Data

(60) Provisional application No. 61/443,110, filed on Feb. 15, 2011.

(51) Int. Cl.
| | |
|---|---|
| *H04W 80/04* | (2009.01) |
| *H04W 88/10* | (2009.01) |
| *H04B 7/02* | (2006.01) |
| *H04W 28/04* | (2009.01) |
| *H04W 84/04* | (2009.01) |

(52) U.S. Cl.
CPC .............. *H04W 88/10* (2013.01); *H04B 7/024* (2013.01); *H04W 28/048* (2013.01); *H04W 84/047* (2013.01)

(58) Field of Classification Search
USPC .................................. 370/328, 331, 334, 338
See application file for complete search history.

(56) References Cited

U.S. PATENT DOCUMENTS

2007/0202921 A1* 8/2007 Stern-Berkowitz et al. ........................ 455/562.1
2010/0056215 A1 3/2010 Gorokhov et al.
(Continued)

FOREIGN PATENT DOCUMENTS

CN 101965004 A 2/2011
EP 2 264 960 A1 12/2010
(Continued)

OTHER PUBLICATIONS

3GPP TR 36.814 V9.0.0 (Mar. 2010), 3rd Generation Partnership Project; Technical Specification Group Radio Access Network; Evolved Universal Terrestrial Radio Access (E-UTRA); Further advancements for E-UTRA physical layer aspects (Release 9).
(Continued)

*Primary Examiner* — Andrew Lee
(74) *Attorney, Agent, or Firm* — Birch, Stewart, Kolasch & Birch, LLP

(57) ABSTRACT

A coordinated multi-point communications system is provided. A first center site is operative to serve one or more user equipment located under coverage of a first cluster. Multiple first remote devices are connected to the first center site and operative to receive downlink signals from the first center site and transmit the downlink signals to the one or more user equipment and/or receive uplink signals from the one or more user equipment and transmit the uplink signals to the first center site. The first center site and the first remote devices form the first cluster to support coordinated multi-point transmission and reception for simultaneously transmitting and/or receiving the downlink and/or uplink signals to and/or from the one or more user equipment, and at least one of the first remote devices is further connected to at least a second center site of a second cluster adjacent to the first cluster.

22 Claims, 8 Drawing Sheets

(56) References Cited

U.S. PATENT DOCUMENTS

| | | | |
|---|---|---|---|
| 2010/0304773 A1* | 12/2010 | Ramprashad | 455/509 |
| 2011/0269459 A1* | 11/2011 | Koo et al. | 455/434 |
| 2011/0271585 A1* | 11/2011 | Miller | 44/388 |
| 2012/0189077 A1* | 7/2012 | Seo et al. | 375/267 |
| 2012/0190389 A1* | 7/2012 | Hui | 455/500 |
| 2012/0327904 A1* | 12/2012 | Park et al. | 370/331 |
| 2013/0089159 A1* | 4/2013 | Liu | 375/267 |
| 2013/0258890 A1* | 10/2013 | Li et al. | 370/252 |
| 2013/0303180 A1* | 11/2013 | Wang et al. | 455/450 |

FOREIGN PATENT DOCUMENTS

| | | | |
|---|---|---|---|
| WO | WO 2010/079985 A2 | 7/2010 | |
| WO | WO 2010/096952 A1 | 9/2010 | |
| WO | WO 2010/107207 A2 | 9/2010 | |
| WO | WO 2010/130277 A1 | 11/2010 | |

OTHER PUBLICATIONS

3GPP TS 36.201 V9.0.0 (Dec. 2009), 3rd Generation Partnership Project; Technical Specification Group Radio Access Network; Evolved Universal Terrestrial Radio Access (E-UTRA); LTE Physical Layer—General Description (Release 9).

3GPP TS 36.211 V9.0.0 (Dec. 2009), 3rd Generation Partnership Project; Technical Specification Group Radio Access Network; Evolved Universal Terrestrial Radio Access (E-UTRA); Physical Channels and Modulation (Release 9).

3GPP TS 36.212 V9.0.0 (Dec. 2009), 3rd Generation Partnership Project; Technical Specification Group Radio Access Network; Evolved Universal Terrestrial Radio Access (E-UTRA); Multiplexing and channel coding (Release 9).

3GPP TS 36.213 V9.0.0 (Dec. 2009), 3rd Generation Partnership Project; Technical Specification Group Radio Access Network; Evolved Universal Terrestrial Radio Access (E-UTRA); Physical layer procedures (Release 9).

3GPP TS 36.214 V9.0.0 (Dec. 2009), 3rd Generation Partnership Project; Technical Specification Group Radio Access Network; Evolved Universal Terrestrial Radio Access (E-UTRA); Physical layer—Measurements (Release 9).

TSG-RAN WG1 #63bis, R1-110546, "Views on CoMP evaluation methodology", Orange, Deutsche Telekom, NTT DoCoMo, Telecom Italia, Telefónica, Vodafone, Dublin, Ireland, Jan. 17-21, 2011.

3GPP TSG RAN WG1 Meeting #53bis (R1-082576); Warsaw, Poland, Jun. 30-Jul. 4, 2008; NTT DoCoMO; "Inter-cell radio Resource Management for Heterogeneous Network"; pp. 1-19.

3GPP TSG RAN WG1#54 (R1-083050), Jeju, Korea, Aug. 18-22, 2008; Huawei, "Inter-eNB and Intra-eNB Schemes for CoMP in LTE-Advanced"; pp. 1-2.

3GPP TSG-RAN1 #54 (R1-083115), Jeju, Korea, Aug. 18-22, 2008; Fujitsu, "Discussion on DL coordinated multipoint transmission"; pp. 1-8.

3GPP TSG RAN WG3 #65, Shenzhen, China Aug. 24-28, 2009; Huawei; "Overview of inter-eNB CoMP impact on RAN3"; R3-091781; pp. 1-4.

\* cited by examiner

COORDINATED MULTI-POINT COMMUNICATIONS SYSTEM AND METHODS FOR CONTROLLING COORDINATED MULTI-POINT TRANSMISSION AND RECEPTION

CROSS REFERENCE TO RELATED APPLICATIONS

This application claims the benefit of U.S. Provisional Application No. 61/443,110, filed on Feb. 15, 2011, the entirety of which is incorporated by reference herein.

BACKGROUND OF THE INVENTION

1. Field of the Invention

The invention is related to the technical field of wireless communications systems. More particularly, the invention is related to the technical field of coordinated multi-point transmission and reception in wireless communications systems.

2. Description of the Related Art

Due to mobile communications technology advancements in recent years, various communications services, such as voice call services, data transfer services, and video call services, etc., may be provided to users regardless of their locations. Most mobile communications systems are multiple access systems in which access and wireless network resources are allocated to multiple users. The multiple access technologies employed by the mobile communications systems include the 1x Code Division Multiple Access 2000 (1x CDMA 2000) technology, the 1x Evolution-Data Optimized (1x EVDO) technology, the Orthogonal Frequency Division Multiplexing (OFDM) technology, the Long Term Evolution (LTE) technology, or others. Evolved from the LTE, the LTE-Advanced is a major enhancement of the LTE standard. The LTE-Advanced should be compatible with LTE equipment, and should share frequency bands with the LTE communications system.

One of the important LTE-Advanced benefits is its ability to take advantage of advanced topology networks. FIG. 1 shows an exemplary deployment of a heterogeneous network according to the prior art. The optimized heterogeneous networks have a mix of macrocells (e.g. the macrocell 10) and low power nodes, such as remote radio heads (RRHs) (e.g. the RRH 20), picocells (e.g. the picocell 30), femtocells (e.g. the femtocell 40) and relay nodes (RNs) (e.g. the relay node 50). Remote radio head is applied for the purpose of inter-cell radio resource management and coverage enhancement, which is a sufficiently small device so that it can easily be installed near antennas. Considering the transmit power of RRH, not only can a low power RRH be employed, but also a high power RRH, having high powers as that of an evolved NodeB (eNB), can be employed in the radio access network (RAN). Therefore, for LTE-Advanced, the RRH may be applicable not only to picocells but also to macrocells. For a RRH, the backhaul link is established on X2 interface, e.g. by optical fiber. Relay node is applied for improving the cell-edge throughput, group mobility and temporary network deployment. For a relay node, the backhaul link is established through air interface. Coordinated multi-point (CoMP) transmission and reception is a novel technique developed under the LTE-Advanced, as a tool to improve the coverage at the cell-edge of an evolved node B (eNB) and/or to increase system throughput in both high load and low load scenarios. CoMP transmission and reception implies dynamic coordination among multiple geographically separated transmission points. The core technology of CoMP may be categorized into Joint Processing (JP) and Coordinated Scheduling/Beamforming (CS/CB).

For Joint Processing (JP), data is available at each point in a CoMP cooperating set. The CoMP cooperating set is a set of (geographically separated) points directly or indirectly participating in data transmission to the user equipment (UE). Note that this set may or need not be transparent to the UE. The CoMP transmission point(s) is the point or set of points actively transmitting data to the UE. For Coordinated Scheduling/Beamforming (CS/CB), data is only available at the serving cell (data transmission from that point) but user scheduling/beamforming decisions are made with coordination among cells corresponding to the CoMP cooperating set, where the serving cell is the cell transmitting physical downlink control channel (PDCCH) assignments.

The Joint Processing (JP) may further be categorized into Joint Transmission (JT) and Dynamic Cell Selection (DCS). For Joint Transmission (JT), data is transmitted from multiple points (part of or entire CoMP cooperating set) at a time. In other words, data to a single user equipment (UE) is simultaneously transmitted from multiple transmission points, so as to improve the received signal quality and/or actively cancel interference for other UEs. For Dynamic Cell Selection (DCS), data is transmitted from one point at a time (within CoMP cooperating set). In other words, data is spread in multiple transmission points of the entire CoMP cooperating set, but there is only one transmission point transmitting data to the UE at a time.

A cluster is defined as a group of CoMP transmission/reception points. How to set the CoMP cooperating sets, i.e. clustering, is expected to play an important role in the CoMP operation and performance. FIG. 2 shows an exemplary deployment of a cluster in a CoMP communications system according to the prior art. In FIG. 2, a center site 110 is surrounded by and connected to six remote devices 120-1 to 120-6, to form a cluster 100. The center site 110 may be an eNB, the remote devices 120-1 to 120-6 may be RRHs, and the connection lines may be the optical fibers. The center site 110 is operative to serve one or more UEs, e.g. 250 and 260, located under the coverage of the cluster 100, and the remote devices 120-1 to 120-6 are controlled by the center site 110 to simultaneously (that is, when the CoMP transmission or reception is performed) or non-simultaneously transmit downlink signals to the one or more UEs and/or receive uplink signals from the one or more UE.

FIG. 3 shows another exemplary deployment of a cluster in a CoMP communications system according to the prior art. In FIG. 3, a center site is surrounded by and connected to eighteen remote devices to form a cluster 200. Regardless of which kind of cluster deployment is, the UEs located within coverage of a cluster can benefit from the intra-site CoMP operation of the cluster. However, a UE located near boundaries of a cluster (such as the coverage boundary) will not be able to gain the benefit of intra-site CoMP operations. For example, referring back to FIG. 2, the UE 250 can benefit from intra-site the CoMP operation of the cluster because both of the remote devices 120-4 and 120-5 can simultaneously transmit or receive signals to or from the UE 250 under the control of the center site 110. However, for the UE 260 located near the coverage boundary of the cluster 100, the center site 110 generally assigns the remote device 120-3 to transmit or receive signals to or from the UE 260 since only the remote device 120-3 is geographically close to the UE 260. In this manner, even if the UE 260 is under the coverage of the cluster deployed to support the CoMP operations, UE 260 is still unable to gain the benefit of intra-site CoMP operations.

To solve this problem, a novel CoMP communications system and methods for controlling CoMP transmission and reception in a wireless communications system is desirable.

BRIEF SUMMARY OF THE INVENTION

According to an embodiment of the invention, a coordinated multi-point communications system comprises a first center site and a plurality of first remote devices. The first center site is operative to serve one or more user equipment located under coverage of a first cluster. The first remote devices are connected to the first center site and operative to receive downlink signals from the first center site and transmit the downlink signals to the one or more user equipment and/or receive uplink signals from the one or more user equipment and transmit the uplink signals to the first center site. The first center site and the first remote devices form the first cluster to support coordinated multi-point transmission and reception for simultaneously transmitting and/or receiving the downlink and/or uplink signals to and/or from the one or more user equipment, and at least one of the first remote devices is further connected to at least a second center site of a second cluster adjacent to the first cluster.

According to another embodiment of the invention, a method for controlling coordinated multi-point transmission and reception in a wireless communications system comprises: connecting a plurality of first remote devices to a first center site to form a first cluster to support coordinated multi-point transmission and reception, wherein the first center site is operative to serve one or more user equipment located under coverage of the first cluster and the first remote devices are controlled by the first center site to simultaneously transmit downlink signals to the one or more user equipment and/or simultaneously receive uplink signals from the one or more user equipment; and connecting at least one second remote device to the first center site, wherein the second remote device belongs to a second cluster adjacent to the first cluster.

According to yet another embodiment of the invention, a method for controlling coordinated multi-point transmission and reception in a wireless communications system comprises: simultaneously transmitting first downlink signals to a first user equipment located in coverage boundary of a first cluster via at least one of a plurality of first remote devices and at least one of a plurality of second remote devices, wherein the first remote devices are connected to a first center site to form the first cluster and the first user equipment is served by the first center site, wherein the second remote devices are connected to a second center site to form a second cluster, and wherein transmission of the first downlink signals is initiated and controlled by the first center site.

Other aspects and features of the present invention will become apparent to those with ordinarily skill in the art upon review of the following descriptions of specific embodiments of apparatuses and methods for measurement control in a wireless communications system.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

As mentioned as above, a cluster includes a group of CoMP transmission/reception points, e.g., remote radio heads (RRHs). Based on a concept of the invention, one or more than one remote device, such as RRHs, in a cluster may be connected to two or more than two cluster's center sites, such as eNBs. These remote devices connected to two or more than two cluster's center sites are usually the ones located at the boundaries of clusters, and these clusters are neighbors. When a UE is located between two boundaries of clusters, the remote device at the boundaries which are connected to both of the two clusters may then help to form an extended cluster to make the UE to be covered by the extended cluster and benefit by the intra-site CoMP operations.

Figure 4:
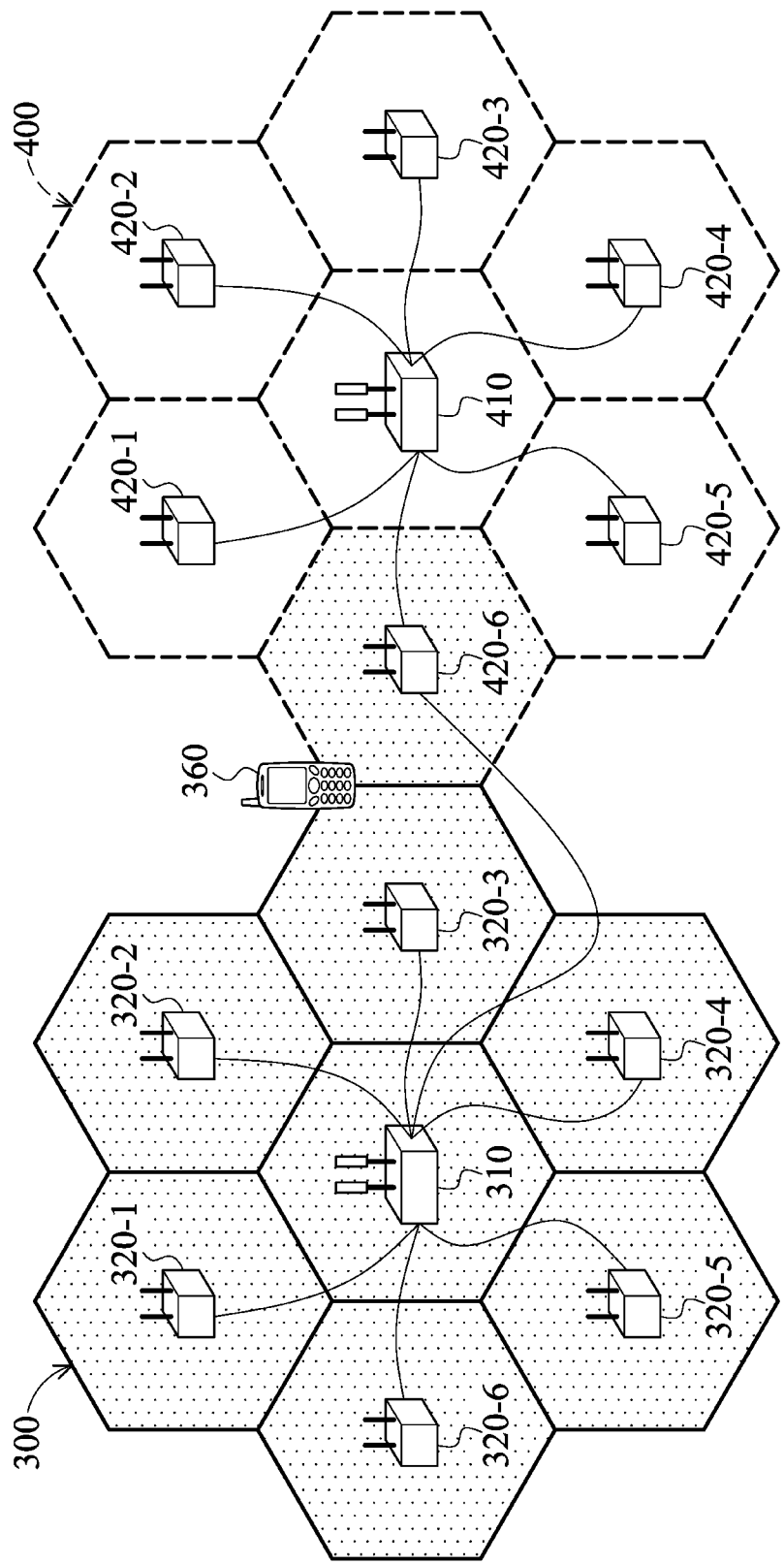
FIG. 4 shows an exemplary deployment of a cluster in a CoMP communications system according to an embodiment of the invention.

FIG. 4 shows an exemplary deployment of a cluster in a CoMP communications system according to an embodiment of the invention. In FIG. 4, clusters 300 and 400 are adjacent to each other. The cluster 300 is formed by the center site 310 and remote devices 320-1 to 320-6 to support CoMP transmission and reception, and the cluster 400 is formed by the center site 410 and remote devices 420-1 to 420-6 to support CoMP transmission and reception. Therefore, the remote devices 320-1 to 320-6 are connected to the center site 310 via the connection lines, and the remote devices 420-1 to 420-6 are connected to the center site 410 via the connection lines. In a preferred embodiment, the center sites 310 and 410 may be the eNBs, the remote devices 320-1 to 320-6 and 420-1 to 420-6 may be the RRHs and the connection lines may be the optical fibers.

The center site 310 is operative to serve one or more UEs located under coverage of the cluster 300 and provide multiple communications services for the UE. Similarly, the center site 410 is operative to serve one or more UEs located under coverage of the cluster 400 and provide multiple communications services for the UE. The remote devices 320-1 to 320-6 are controlled by the center site 310 to receive downlink signals from the center site 310 and transmit the downlink signals to the UE(s) served by the center site 310 and/or receive uplink signals from the UE(s) served by the center site 310 and transmit the uplink signals to the center site 310.

Figure 1:
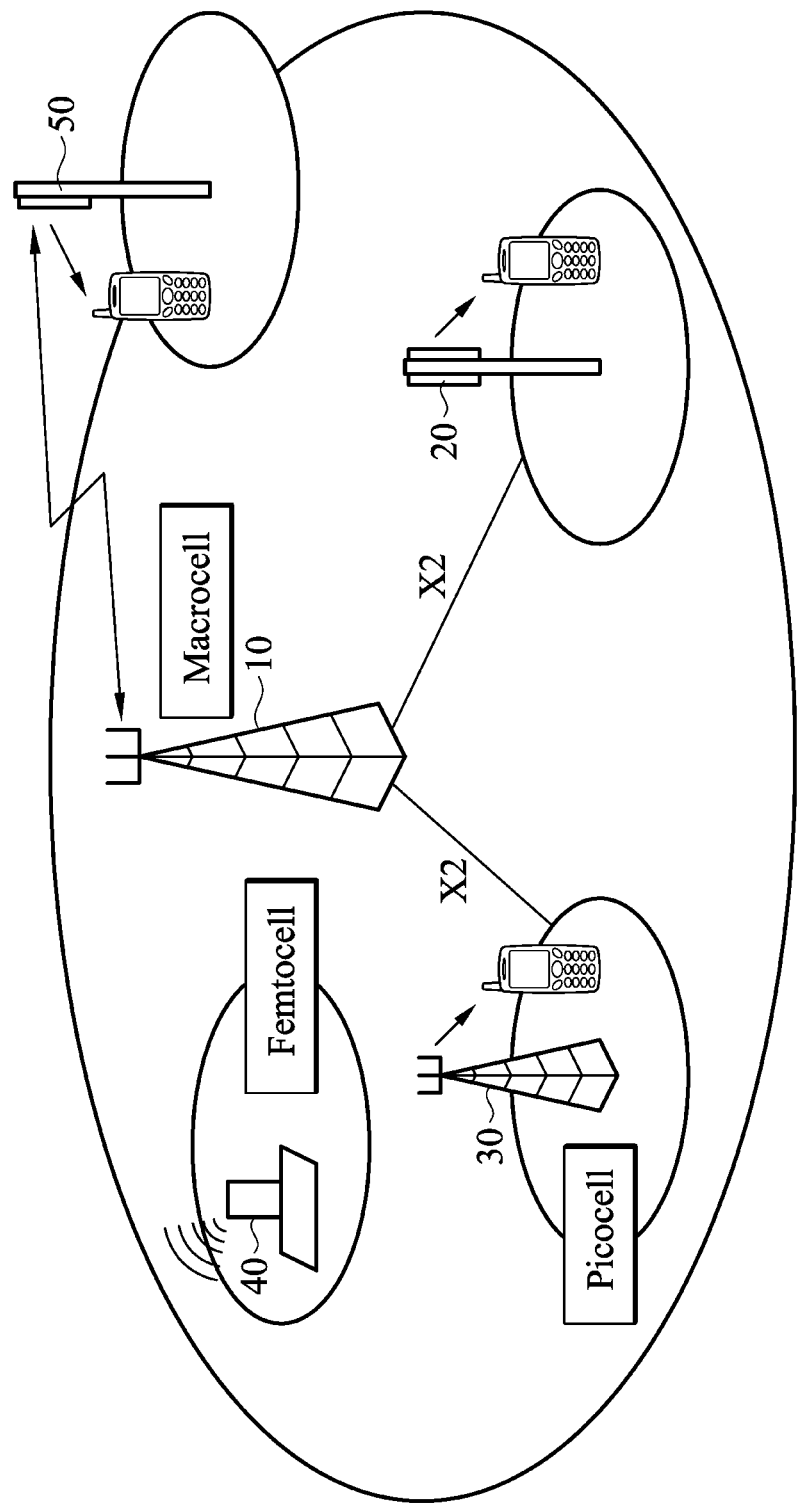
FIG. 1 shows an exemplary deployment of a heterogeneous network according to the prior art.
Figure 2:
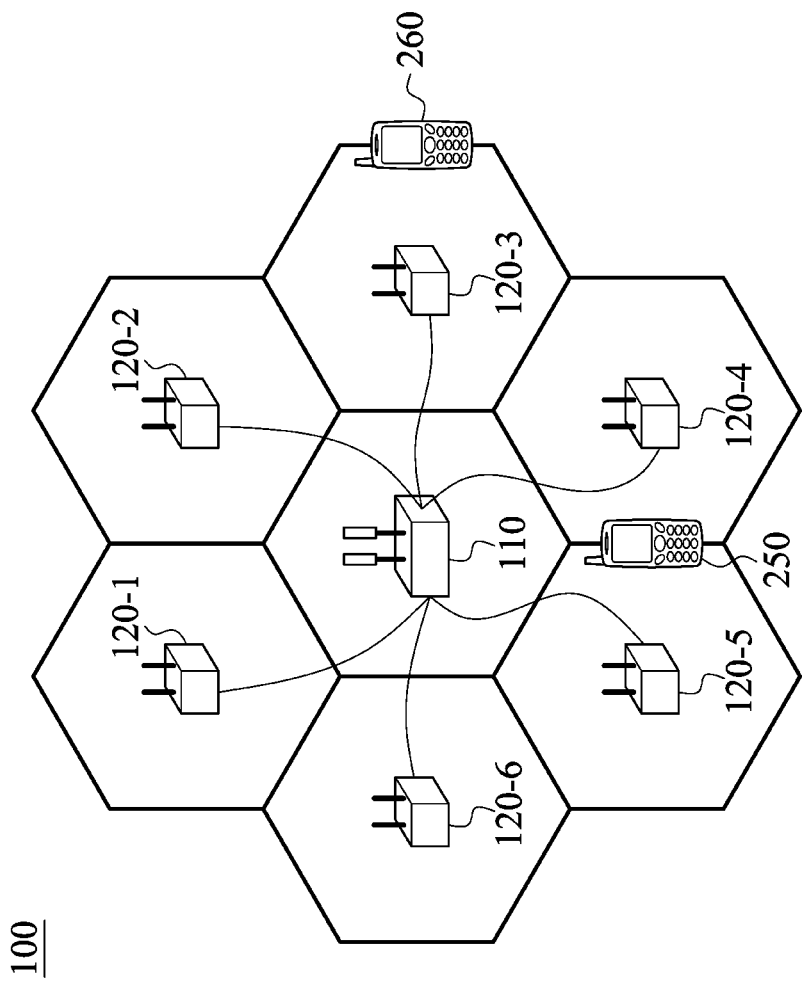
FIG. 2 shows an exemplary deployment of a cluster in a CoMP communications system according to the prior art.
Figure 3:
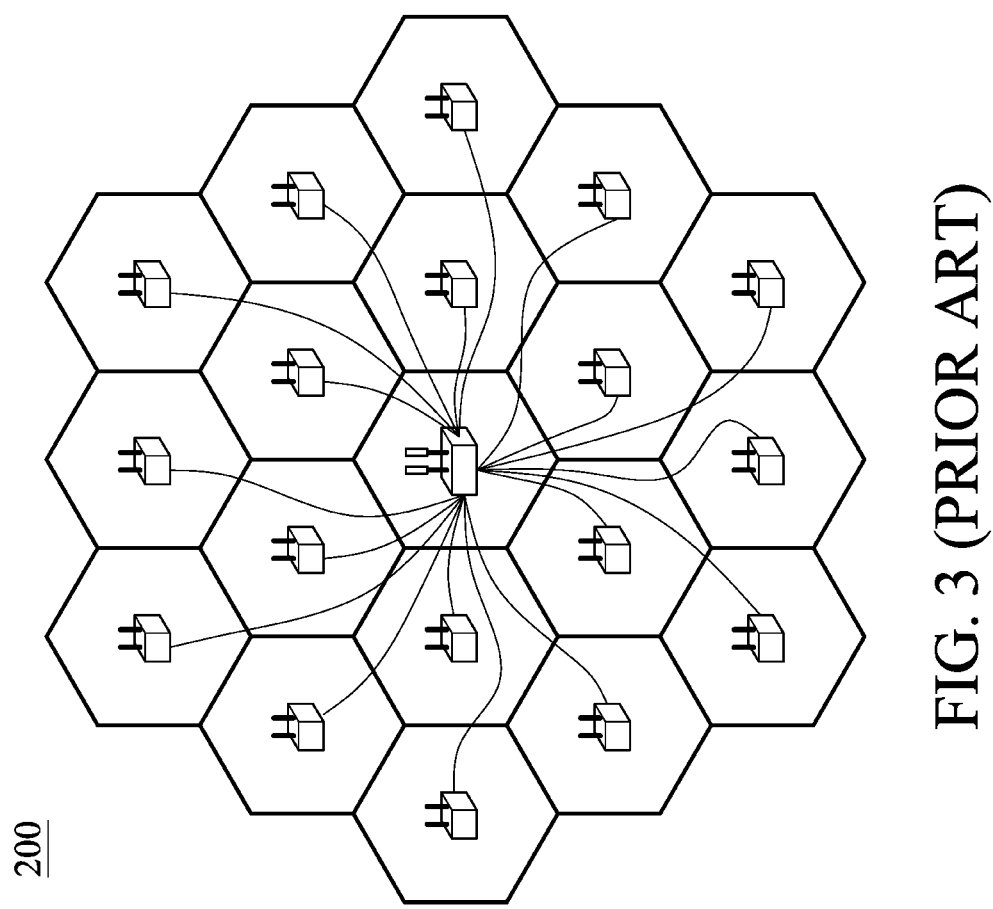
FIG. 3 shows another exemplary deployment of a cluster in a CoMP communications system according to the prior art.

Similarly, the remote devices 420-1 to 420-6 are controlled by the center site 410 to receive downlink signals from the center site 410 and transmit the downlink signals to the UE(s) served by the center site 410 and/or receive uplink signals from the UE(s) served by the center site 410 and transmit the uplink signals to the center site 410. As shown in FIG. 4, in this embodiment, the remote device 420-6 is further connected to the center site 310 to form an extended cluster. To be more specific, the extended cluster may be formed by the center site 310, the remote devices 320-1 to 320-6 and plus the remote device 420-6. The coverage area of the extended cluster is shown as the dotted area in FIG. 4. According to an embodiment of the invention, in some predetermined time, the remote device 420-6 may further be controlled by the center site 310 and be operative to receive downlink signals from the center site 310 and transmit the downlink signals to the UE(s) served by the center site 310, such as a UE 360 located near the boundaries of the clusters 300 and 400, and/or receive uplink signals from the UE(s) served by the center site 310 and transmit the uplink signals to the center site 310. In this manner, when a UE (such as the UE 360) is located between coverage boundaries of the clusters 300 and 400, the remote device 420-6 may join the extended cluster and cooperate with the center site 310 and the remote device 320-3 to make the UE be covered by the extended cluster and benefit by the intra-site CoMP operations. Note that the deployment shown in FIG. 4 is merely an example to clearly illustrate the invention concept. Those with ordinary skill in the art will readily appreciate that there are still other kinds of different cluster deployments, such as the deployment shown in FIG. 3, and therefore, the invention should not be limited thereto. For example, there may be two or more remote devices positioned at the coverage boundary of a cluster as the cluster 200 and connected to a center site of an adjacent cluster.

Figure 5:
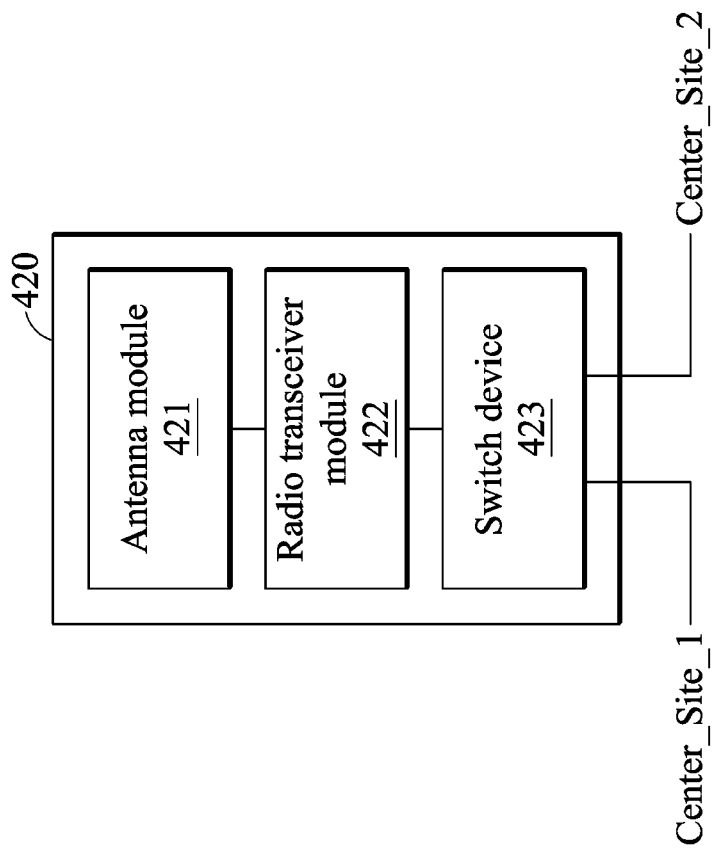
FIG. 5 shows a block diagram of a remote device according to an embodiment of the invention.

FIG. 5 shows a block diagram of a remote device according to an embodiment of the invention. The remote device 420 may comprise an antenna module 421, a radio transceiver module 422 and a switch device 423. The antenna module 421 may comprise at least one antenna for transceiving RF signals, and the radio transceiver module 422 may comprise at least one RF module for performing RF signal processing. The RF module may comprise a plurality of hardware devices to perform modulation and/or radio frequency conversion. For example, the RF module may comprise a modulator and a demodulator for modulating/demodulating signals, one or more power amplifiers, and/or a mixer to multiply the baseband signals received from the connected center site with a carrier oscillated in the radio frequency of the wireless communications system. Note that in some embodiments of the invention, when the multiple-input multiple-output (MIMO) technique is supported, the antenna module 421 may further comprise multiple antennas for transceiving RF signals from different directions for spatial diversity, and the radio transceiver module 422 may further comprise multiple one RF modules for processing the RF signals received from different antennas. Therefore, the invention should not be limited to what is shown in FIG. 5.

The switch device 423 is operative to selectively connect the multi-connected remote device 420 to different center sites, labeled by Center_Site_1 and Center_Site_2 as shown, such as the center site 310 and the center site 410. Therefore, the signals transmitted to or received from different center sites may be controlled by the switch device 423 and there is only one center site being able to communicate with the remote device 420 at one time. According to an embodiment of the invention, the switch device 423 may a multiplexer, or any device having switching or multiplexing/de-multiplexing functionality. According to another embodiment of the invention, the switch device may also be implemented on the outside of the remote device, and the invention should not be limited to what is shown in FIG. 5. For example, the switch device may be implemented on the outside of the remote device 420-6, and be connected between the remote device 420-6, the center site 310 and the center site 410, so as to selectively connect the remote device 420-6 to the center site 310 or the center site 410.

According to the embodiments of the invention, the center sites 310 and 410 may control signal transmission and/or reception of the remote device 420-6 in a time division manner. In one embodiment, the remote device 420-6 may be controlled by different center sites by means of a periodic cycle. For example, a first frame or sub-frame may be used and controlled by one center site and a second frame or sub-frame may be used and controlled by another center site. For another example, the odd frames or sub-frames may be used and controlled by one center site and the even frames or sub-frames may be used and controlled by another center site.

In another embodiment, the remote device 420-6 may be controlled by different center sites aperiodically. For example, one or more frames or sub-frames may be predetermined and reserved for the center site (such as the center site 310) of the extended cluster for controlling signal transmission and/or reception of the remote device 420-6, while the remaining frames or sub-frames would still be controlled by the original center site (such as the center site 410) of the remote device 420-6.

For another example, one or more resource elements (RE) (including the REs in the control region and data region) in a sub-frame may be predetermined and reserved for the center site (such as the center site 310) of the extended cluster for controlling signal transmission and/or reception of the remote device 420-6, while the remaining resource elements would still be controlled by the original center site (such as the center site 410) of the remote device 420-6. Therefore, the REs of the multi-connected remote device 420-6 are mainly control by the center site of the original cluster and the center site of the extended cluster may only use or control the remote device 420-6 in a portion of REs for transmission and/or reception.

In yet another embodiment, the remote device 420-6 may be controlled by different center sites dynamically. For example, the center site 310 may communicate with the center site 410 (and vise versa) via the interface and communication protocol defined therebetween to determine the right of controlling the remote device 420-6 at a predetermined time. The interface may be an X2 interface when the center sites 310 and 410 are eNBs.

Figure 6:
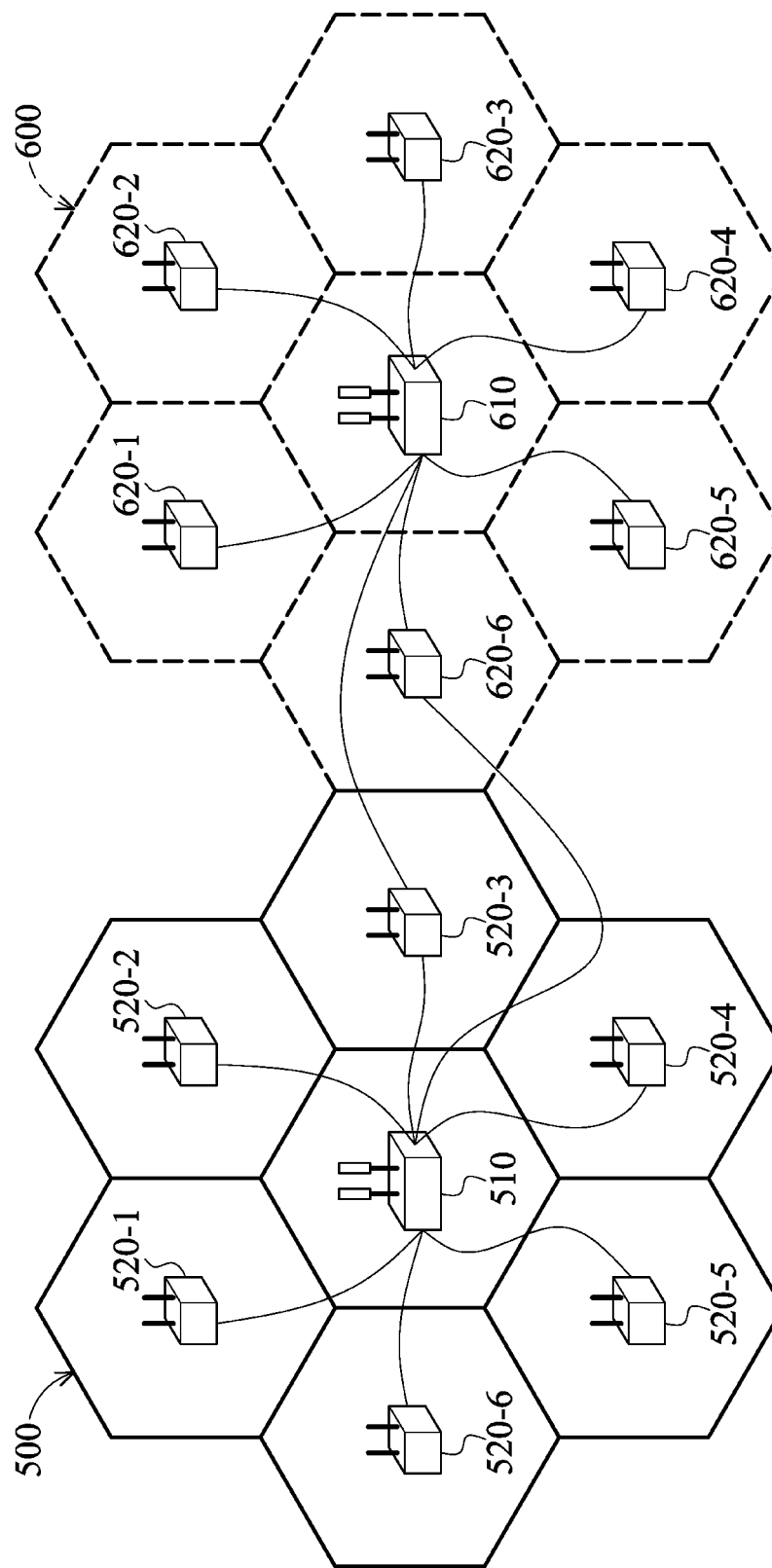
FIG. 6 shows another exemplary deployment of a cluster in a CoMP communications system according to another embodiment of the invention.

FIG. 6 shows another exemplary deployment of a cluster in a CoMP communications system according to another embodiment of the invention. Note that the deployment shown in FIG. 6 is merely an example to clearly illustrate the invention concept. Those with ordinary skill in the art will readily appreciate that there are still other kinds of different cluster deployments, such as the deployment shown in FIG. 3, and therefore, the invention should not be limited thereto. In FIG. 6, clusters 500 and 600 are adjacent to each other. The cluster 500 is formed by the center site 510 and remote devices 520-1 to 520-6 to support CoMP transmission and reception, and the cluster 600 is formed by the center site 610 and remote devices 620-1 to 620-6 to support CoMP transmission and reception. The remote devices 520-1 to 520-6 are connected to the center site 510 via the connection lines, and the remote devices 620-1 to 620-6 are connected to the center site 610 via the connection lines. In a preferred embodiment, the center sites 510 and 610 may be the eNBs, the remote devices 520-1 to 520-6 and 620-1 to 620-6 may be the RRHs and the connection lines may be the optical fibers.

The center site 510 is operative to serve one or more UEs located under coverage of the cluster 500 and provide multiple communications services for the UE. Similarly, the center site 610 is operative to serve one or more UEs located under coverage of the cluster 600 and provide multiple communications services for the UE. The remote devices 520-1 to 520-6 are controlled by the center site 510 to receive downlink signals from the center site 510 and transmit the downlink signals to the UE(s) served by the center site 510 and/or receive uplink signals from the UE(s) served by the center site 510 and transmit the uplink signals to the center site 510. Similarly, the remote devices 620-1 to 620-6 are controlled by the center site 610 to receive downlink signals from the center site 610 and transmit the downlink signals to the UE(s) served by the center site 610 and/or receive uplink signals from the UE(s) served by the center site 610 and transmit the uplink signals to the center site 610.

Different from the embodiment shown in FIG. 4, in this embodiment, the remote device 620-6 is further connected to the center site 510 to form an extended cluster, and the remote device 520-3 is further connected to the center site 610 to form another extended cluster. To be more specific, a first extended cluster may be formed by the center site 510, the remote devices 520-1 to 520-6 and plus the remote device 620-6, and a second extended cluster may be formed by the center site 610, the remote devices 620-1 to 620-6 and plus the remote device 520-3. In this manner, when a UE is located between coverage boundaries of the clusters 500 and 600, the remote device 620-6 may join the first extended cluster controlled by the center site 510 and cooperate with the center site 510 and the remote device 520-3, or the remote device 520-3 may join the second extended cluster controlled by the center site 610 and cooperate with the center site 610 and the remote device 620-6, to make the UE be covered by the extended cluster and benefit by the intra-site CoMP operations.

Note that under the deployment as shown in FIG. 6, the CoMP operation for the UE located between coverage boundaries of the clusters 500 and 600 may be controlled by either the center site 510 or the center site 610. The decision rule may be designed according to system loading, throughput requirements or others. Note further that the device structure, operations and controlling mechanisms of the multi-connected remote devices 520-3 and 620-6 are similar to that of the multi-connected remote device 420-6 as illustrated above. Reference may be made to the embodiments as illustrated above and detailed descriptions are omitted here for brevity.

Figure 7:
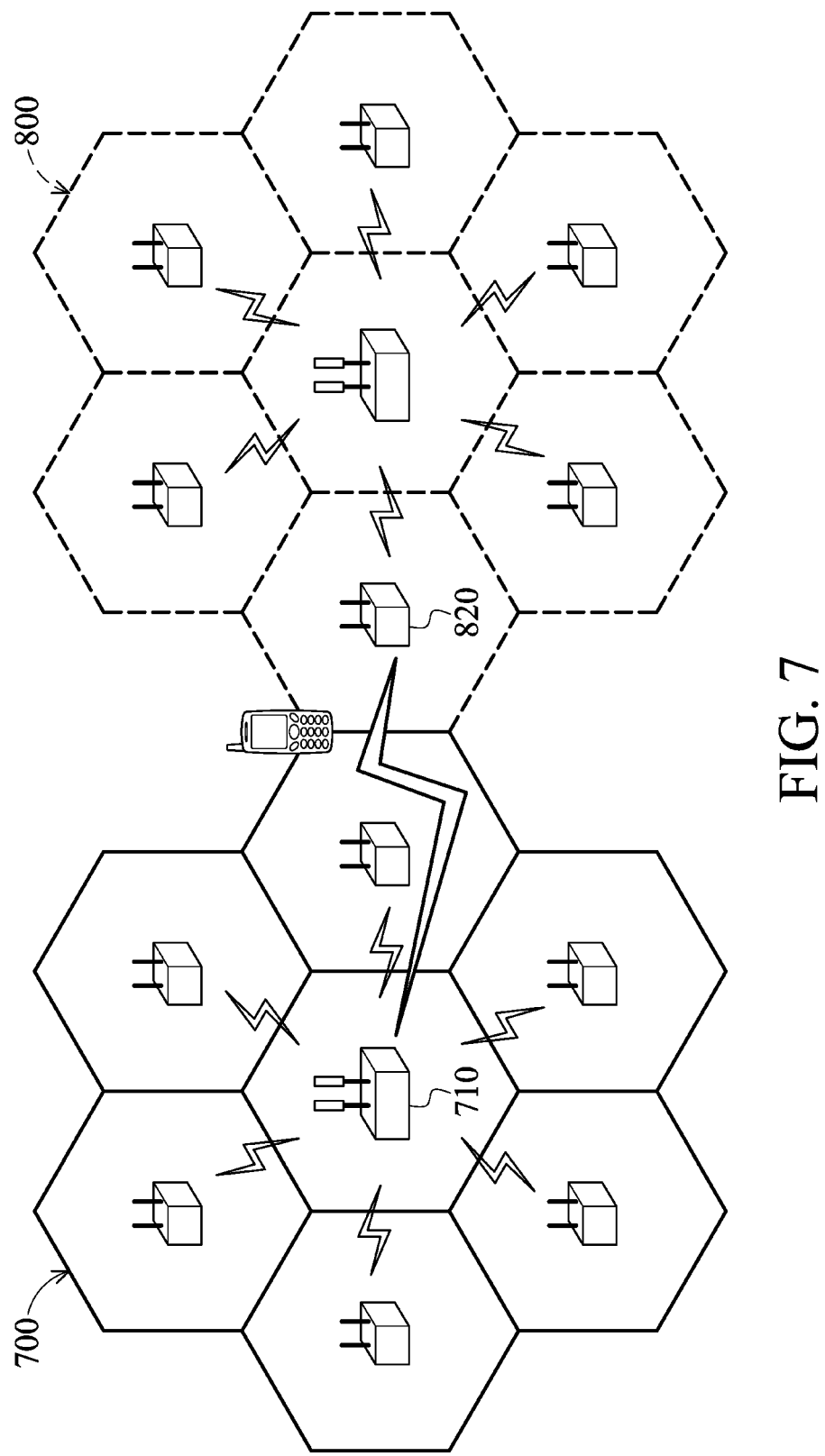
FIG. 7 shows another exemplary deployment of a cluster in a CoMP communications system according to another embodiment of the invention.

In yet another embodiment, the concept of the extended cluster of the invention is also applied on an eNB and associated relay nodes, where the backhaul links are established through the air interface. FIG. 7 shows an exemplary deployment of a cluster, including an eNB and multiple relay nodes, in a CoMP communications system according to an embodiment of the invention. In FIG. 7, a relay node 820 of a cluster 800 is able to communicate, through the air interface, with an eNB 710 of a cluster 700 that is adjacent to the cluster 800. Therefore, the eNB 710 can control the relay nodes in the cluster 700 and also the relay node 820, forming an extended cluster, thus a UE located near the boundary can benefit by the intra-site CoMP and the throughput in the cell-edge is also enhanced.

Figure 8:
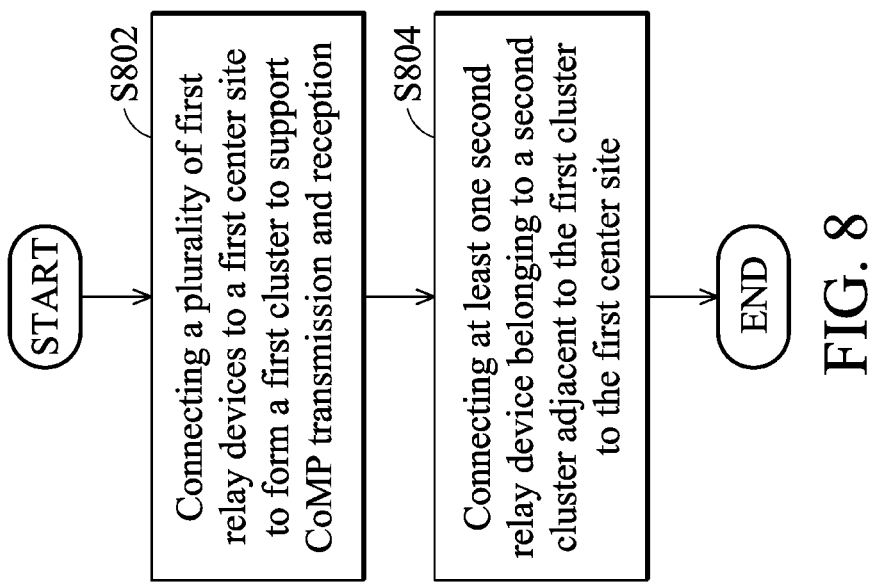
FIG. 8 shows a flow chart of a method for controlling coordinated multi-point transmission and reception in a wireless communications system according to an embodiment of the invention.

FIG. 8 shows a flow chart of a method for controlling coordinated multi-point transmission and reception in a wireless communications system according to an embodiment of the invention. When deploying an enhanced CoMP communications system having at least an extended cluster, a plurality of first remote devices may be firstly connected to a first center site to form a first cluster to support CoMP transmission and reception (Step S802). The first center site is operative to serve one or more UEs located under coverage of the first cluster and the first remote devices are controlled by the first center site to simultaneously or non-simultaneously transmit downlink signals to the one or more UEs and/or simultaneously or non-simultaneously receive uplink signals from the one or more UE. Next, at least one second remote device belonging to a second cluster adjacent to the first cluster may be connected to the first center site (Step S804) so as to form an extended cluster.

Under such extended cluster deployment, simultaneously transmitting or receiving signals to or from a UE located in the coverage boundary of the first cluster may be achieved by using the second remote device and at least one of the first remote devices adjacent to the second remote device, so as to improve the signal quality and/or actively cancel interference for other UEs. Note that the CoMP transmission and reception may be triggered and controlled by the first center site.

In addition, in some embodiments of the invention, at least one of the first remote devices adjacent to the second remote device may also be connected to a second center site of the second cluster, so as to form another extended cluster. In this manner, the CoMP operations may be triggered and controlled by the first center site or the second center site, depending on which extended cluster the CoMP operations are going to be taken place in.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A coordinated multi-point communications system, comprising:
    a first center site, operative to serve one or more user equipment located under coverage of a first cluster; and
    a plurality of first remote devices, connected to the first center site and operative to receive downlink signals from the first center site and transmit the downlink signals to the one or more user equipment and/or receive uplink signals from the one or more user equipment and transmit the uplink signals to the first center site,
    wherein the first center site and the first remote devices form the first cluster to support coordinated multi-point transmission and reception for simultaneously transmitting and/or receiving the downlink and/or uplink signals to and/or from the one or more user equipment,
    wherein at least one of the first remote devices is further connected to at least a second center site of a second cluster adjacent to the first cluster, and
    wherein the first remote device connected to the second center site comprises:
        at least one antenna;
        at least one radio frequency module; and
        a switch device, selectively controlled by the first center site of the first cluster and the second center site of the second cluster to connect the first remote device to the first center site or the second center site, respectively.

2. The coordinated multi-point communications system of claim 1, wherein the first remote device connected to the second center site is further operative to receive downlink signals from the second center site and transmit the downlink signals to at least one user equipment served by the second center site and/or receive uplink signals from the user equipment served by the second center site and transmit the uplink signals to the second center site.

3. The coordinated multi-point communications system of claim 1, further comprising:
   a switch device, operative to selectively connect the first remote device to the first center site or the second center site.

4. The coordinated multi-point communications system of claim 1, wherein the first center site and the second center site are evolved node B.

5. The coordinated multi-point communications system of claim 1, wherein the first remote devices are remote radio heads.

6. The coordinated multi-point communications system of claim 5, wherein the first remote device is connected to the second center site via an optical fiber.

7. The coordinated multi-point communications system of claim 1, wherein the first remote device is connected to the second center site via the air interface.

8. The coordinated multi-point communications system of claim 7, wherein the first remote devices are relay nodes.

9. The coordinated multi-point communications system of claim 1, wherein the first and second center sites control signal transmission and/or reception of the first remote device in a time division manner.

10. The coordinated multi-point communications system of claim 1, wherein one or more resource elements of the first remote device connected to the second center site is/are reserved for and controlled by the second center site for signal transmission and/or reception.

11. The coordinated multi-point communications system of claim 1, further comprising:
    at least one of a plurality of second remote devices, connected to both of the first center site and the second center site,
        wherein the second center site and the second remote devices form the second cluster.

12. A method for controlling coordinated multi-point transmission and reception in a wireless communications system, comprising:
    connecting a plurality of first remote devices to a first center site to form a first cluster to support coordinated multi-point transmission and reception, wherein the first center site is operative to serve one or more user equipment located under coverage of the first cluster and the first remote devices are controlled by the first center site to simultaneously transmit downlink signals to the one or more user equipment and/or simultaneously receive uplink signals from the one or more user equipment; and
    connecting at least one second remote device to the first center site, wherein the second remote device belongs to a second cluster adjacent to the first cluster, and the second cluster includes a second center site, and
    wherein the at least one second remote device is selectively controlled by the first center site of the first cluster and the second center site of the second cluster to be connected to the first center site or the second center site, respectively.

13. The method of claim 12, further comprising:
    simultaneously transmitting the downlink signals to a user equipment located in coverage boundary of the first cluster via the second remote device and at least one of the first remote devices adjacent to the second remote device, wherein the transmission is triggered and controlled by the first center site.

14. The method of claim 12, further comprising:
    connecting at least one of the first remote devices adjacent to the second remote device to a second center site of the second cluster; and
    simultaneously transmitting downlink signals to a user equipment located in coverage boundary of the second cluster via the second remote device and the at least one of the first remote devices connected to the second center site,
    wherein the transmission is triggered and controlled by the second center site.

15. The method of claim 12, further comprising:
    controlling signal transmission and/or reception of the second remote device in a time division manner by the first center site and a second center site of the second cluster.

16. The method of claim 12, further comprising:
    reserving one or more resource elements in a sub-frame of the second remote device for the first center site for controlling signal transmission and/or reception of the second remote device.

17. A method for controlling coordinated multi-point transmission and reception in a wireless communications system, comprising:
    simultaneously transmitting first downlink signals to a first user equipment located in coverage boundary of a first cluster via at least one of a plurality of first remote devices and at least one of a plurality of second remote devices,
    wherein the first remote devices are connected to a first center site to form the first cluster and the first user equipment is served by the first center site,
    wherein the second remote devices are connected to a second center site to form a second cluster, and
    wherein transmission of the first downlink signals is initiated and controlled by the first center site,
    wherein the at least one of the plurality of second remote devices is selectively controlled by the first center site of the first cluster and the second center site of the second cluster to be connected to the first center site or the second center site, respectively.

18. The method of claim 17, wherein the at least one of the plurality of second remote devices transmitting the first downlink signals is further connected to the first center site and the method further comprises:
    controlling signal transmission and/or reception of the at least one of the plurality of second remote devices in a time division manner by the first center site and the second center site.

19. The method of claim 17, further comprising:
    reserving one or more resource elements in a sub-frame of the at least one of the plurality of second remote devices for the first center site for controlling signal transmission and/or reception of the at least one of the plurality of second remote devices.

20. The method of claim 17, further comprising:
    simultaneously transmitting second downlink signals to a second user equipment located in coverage boundary of the second cluster via the at least one of the plurality of first remote devices and the at least one of the plurality of second remote devices,
    wherein the second user equipment is served by the second center site and the transmission is initiated and controlled by the second center site.

21. The method of claim 17, wherein the at least one of the plurality of first remote devices transmitting the second downlink signals is further connected to the second center site and the method further comprises:

controlling signal transmission and/or reception of the at least one of the plurality of first remote devices in a time division manner by the first center site and the second center site.

22. The method of claim 17, further comprising:
reserving one or more resource elements in a sub-frame of the at least one of the plurality of first remote devices for the second center site for controlling signal transmission and/or reception of the at least one of the plurality of first remote devices.

* * * * *